L. P. CRECELIUS.
METHOD OF UNITING METAL BODIES.
APPLICATION FILED APR. 30, 1915.
1,295,009.
Patented Feb. 18, 1919.
2 SHEETS—SHEET 2.
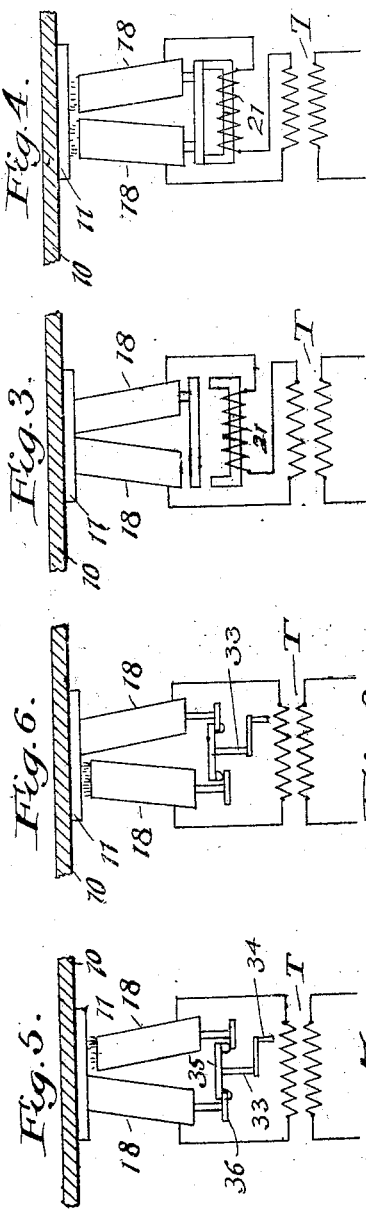
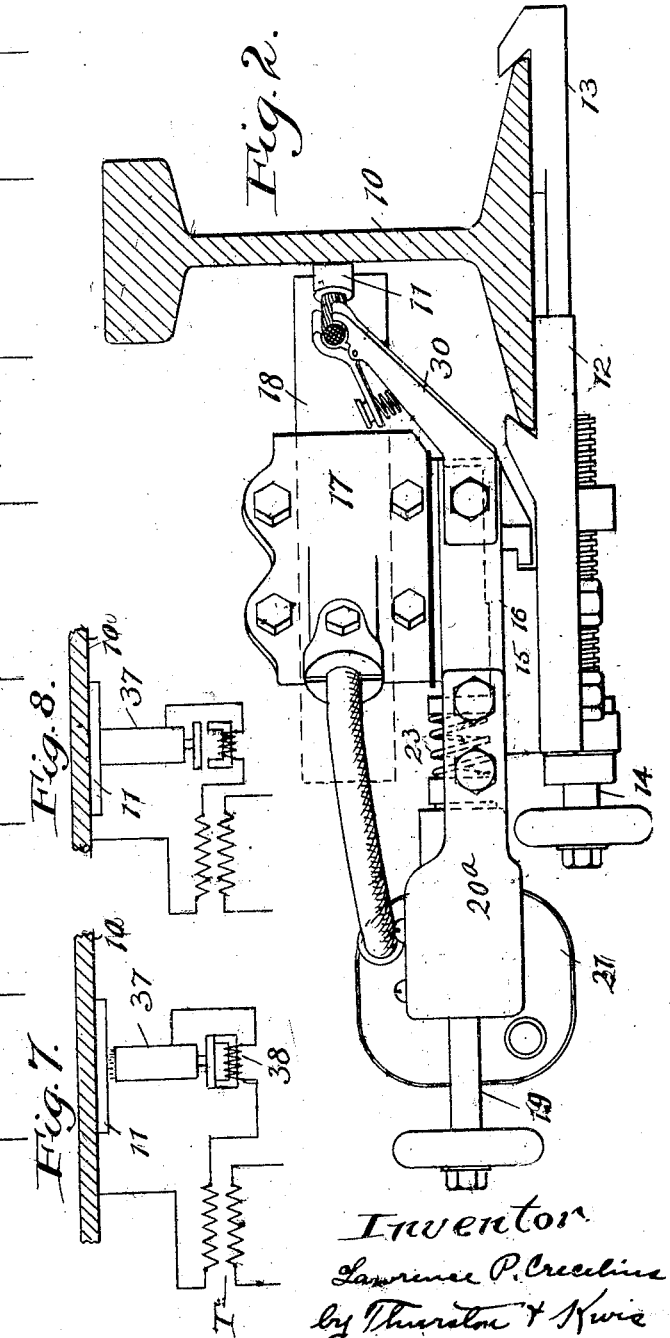

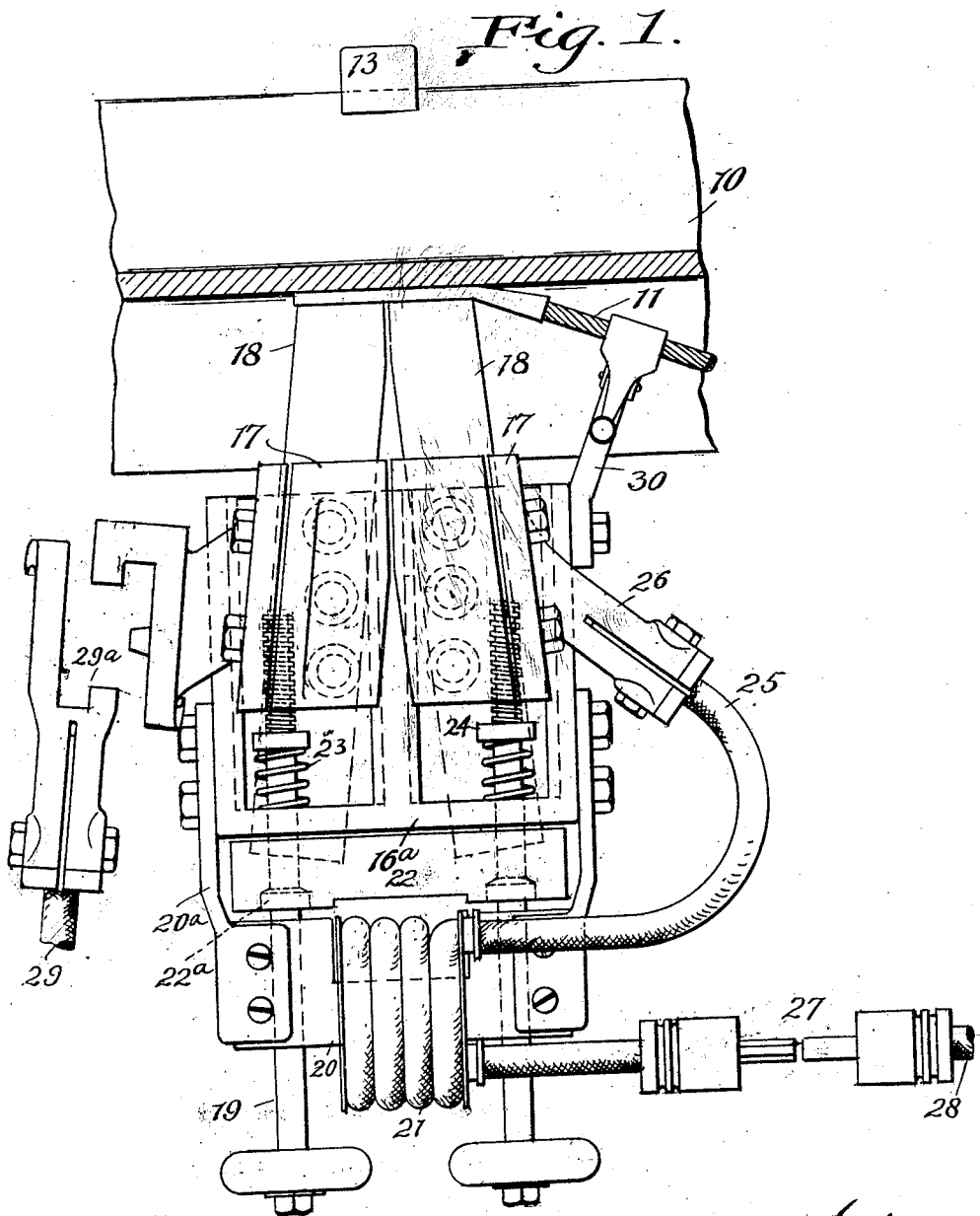

UNITED STATES PATENT OFFICE.

LAWRENCE P. CRECELIUS, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF UNITING METAL BODIES.

1,295,009.  Specification of Letters Patent.  Patented Feb. 18, 1919.

Application filed April 30, 1915. Serial No. 24,930.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Methods of Uniting Metal Bodies, of which the following is a full, clear, and exact description.

This invention relates to a process of uniting metal bodies and is an improvement over the process constituting the subject matter of the Patent #1,133,268 granted to me on March 30th, 1915, for process of uniting metal bodies.

It is customary to unite metal bodies, and especially to braze copper bonds to steel rails by pressing against one of the bodies (which for convenience will be assumed to be a rail bond) either one or two high resistance heating electrodes through which the heating current is passed. When a single electrode is used, the current is passed through the electrode, bond and rail, and in the use of two electrodes employed in the manner disclosed in patent above referred to, the current passes from one electrode into the bond and from the bond into the other electrode, the three parts, namely the two electrodes and the bond being in series relation.

The use of two electrodes connected in series, and both bearing against the bond has the advantage over the use of a single electrode in that the current required to braze the bond to the rail is a great deal less than that required with a single electrode. By thus reducing the current required, comparatively small leads extending between the secondary of the transformer and the two electrodes may be employed, and this gives the apparatus considerable flexibility in use and permits the bonding apparatus *per se* to be compactly arranged and to be carried by hand from point to point along the track, and enables the size and weight of the rotary converter and transformer to be very materially reduced.

The present invention, which may be utilized to advantage either with a single electrode or with the two series connected electrodes, has for its principal object to reduce still further the current required in uniting the metal bodies and also to enable the same to be united in less time than is required with the methods in use prior to this invention.

In accordance with the present invention, one or more high resistance heating electrodes are utilized, designed to be pressed against one of two bodies to be united so as to heat the same by conduction, and an arcing is created in the circuit at the electrode or electrodes. This arcing not only makes the electrode intensely hot in an exceedingly short space of time, but by creating the arcing between the electrode and the body which it is designed to engage as by vibrating the electrode, the body is heated by the direct action of the flame or arc in addition to being heated by conduction from the hot electrode.

The invention may be further briefly summarized as consisting in certain novel steps of the improved method which will be described in the specification and set forth in the appended claims.

Although my invention may be utilized for a variety of specifically different purposes, and although it can be carried out with many types or forms of apparatus, in the drawings I have shown it applied to a form of rail bonding apparatus, and when so employed is adapted to braze bonds to the rails.

In the drawings, Figure 1 is a plan view of the rail bonding apparatus equipped with one form of my invention and applied to a rail; Fig. 2 is a side view of the same; Figs. 3 and 4 are diagrammatic views illustrating the form of the invention of Figs. 1 and 2, Fig. 3 showing the electrodes both in contact with the bond terminal and Fig. 4 showing them both withdrawn therefrom to form the arc; Figs. 5 and 6 are somewhat similar diagrammatic views showing conventionally electrode vibrating means wherein first one electrode is moved away from and toward the rail and then the other; Figs. 7 and 8 are diagrammatic views showing the use of a single electrode adapted to be vibrated in accordance with my invention, one view showing the electrode withdrawn from the metal member which it is adapted to engage, and the other showing the electrode in contact with the metal member.

It may be mentioned at this point that the apparatus by which the process of this application is carried out constitutes the subject matter of an application, Serial No. 24,931, filed by me on even date herewith.

Referring now to the drawings, 10 represents a rail to which a rail bond 11 is adapted to be brazed. The electrodes and electrode carrying parts are supported from the rail by a clamp composed of two parts 12 and 13 which are adapted to engage opposite edges of the rail flange as shown in Fig. 2, and are adapted to be moved relatively to and from clamping position by means of an adjusting screw 14. On the part 12 of the clamp is a plate 15, the front edge of which is undercut, as shown in Fig. 2, and is parallel to the rail and supported on this plate 15 is an electrode carrier 16 having on its lower side an undercut flange, which is adapted to engage the front edge of the plate 15. The electrode carrier 16 can be readily lifted from the plate 15, or placed in position thereon and adjusted lengthwise of the plate 15 to properly position the electrodes with reference to the point to which the bond is to be attached. This carrier is provided with a pair of slides movable in guideways in the carrier 16, the slides being provided with electrode holders 17 carrying high resistance heating electrodes 18, preferably formed of carbon. The electrodes may be adjusted relative to each other and to the terminal of the bond 11 by a pair of adjusting screws 19 having a threaded connection with the slides and passing loosely through the rear end 16ª of the carrier 16.

The electrodes may be vibrated in numerous ways either automatically or manually and by mechanical means or electrical means. In Figs. 1 and 2 I have illustrated electrical vibrating means, comprising a magnet which is provided with a laminated core 20 supported by brackets 20ª from the carrier 16 and surrounded by an energizing coil 21. The magnet includes also a laminated armature 22 through which the adjusting screws 19 pass, this armature having a predetermined movement toward and from the core, and when moved toward the core being adapted to pull the electrodes away from or out of engagement with the terminal of the bond. To this end the adjusting screws are provided with abutments or shoulders shown by dotted lines at 22ª, which abutments are adapted to be engaged by the armature when pulled toward the core, and in this case being seated in recesses in the armature. The electrodes are moved into engagement with the bond 11, and are held yieldingly against the same with predetermined pressure by coil springs 23 surrounding the adjusting screws 19 and arranged between the end 16ª of the electrode carrier and abutments 24 on the adjusting screws.

It will be observed that the energizing coil 21 of the magnet is connected in circuit with the electrodes, one terminal of the magnet being connected by a conductor 25 and coupling 26 to one of the electrode holders 17, and the other terminal of the magnet being connected by a two-part coupling 27 to a lead or conductor 28 which extends to one terminal of the secondary of a step-down transformer or other suitable source of current. The other lead or conductor 29 is connected by a quick detachable coupling 29ª to the other electrode holder 17. In consequence, when the electrodes are both in engagement with the terminal of the bond the circuit is completed and current passes in series through the two electrodes and bond and also through the energizing coil 21 of the magnet. As soon as the magnet is energized the armature 20 is attracted toward the core and both electrodes are simultaneously pulled away from the bond. This breaks the circuit, causing the deënergization of the magnet and permitting the springs 23 to immediately move the electrodes again into contact with the terminal of the bond. This is immediately followed by the energization of the magnet and the withdrawal of the electrode from the terminal. This results in a rapid vibration of the electrodes to and from the terminal of the bond, causing an almost continuous but in fact a rapidly interrupted arcing to take place between the electrodes and the terminal of the bond. The bond is, therefore, heated by conduction from the electrodes while engaging the bond; also by the passage of current through the bond and by the heat created by the arcing between the electrodes and the bond. This quickly raises the terminal of the bond and the adjacent portion of the rail to brazing temperature, and the brazing material, not shown, to fusion temperature, and by this process the bond can be brazed to the rail in less time and with less current than would be required with a single electrode pressed continuously against the bond and with two electrodes pressed continuously against the bond, as described in my prior patent above referred to.

With this arrangement, both electrodes are simultaneously moved from or into contact with the terminal of the bond, and therefore it is desirable that the bond be held in position against the rail by means other than the electrodes. This can be done in various ways, such as by means of a clamp 30, which is supported from the carrier, and is provided with two spring pressed clamping jaws which engage the bond near the terminal.

It will be understood that the pressure of the two electrodes against the bond can be relatively varied or adjusted by means of the adjusting screws 19, as in my prior patent, so as to adjust the heating effects opposite the two electrodes. The vibrator does not in any way affect or prevent the adjusting of the pressures of the electrodes on the bond terminal, for while the vibration is taking place the pressure of either electrode on the terminal may be increased or decreased. Furthermore, it is possible with the apparatus here shown to force either electrode so tightly against the terminal that it will not be moved away from the same by the armature of the magnet.

It is not at all necessary that the electrodes be vibrated by electrical means, for, as disclosed in the corresponding apparatus application Serial No. 24,931, they may be vibrated either electrically or mechanically.

In Figs. 3 and 4, I have shown conventionally the electric vibrator and part of the electric circuits, including the connections to the transformer T, one view showing both electrodes in engagement with the bond terminal, and the other view showing both electrodes out of engagement with the terminal.

In Figs. 5 and 6, I have shown conventionally a mechanical vibrator wherein the electrodes are alternately vibrated or moved from and then toward or in engagement with the bond terminal by a manually operable mechanical device, including a shaft 33 adapted to be rotated by a crank 34, and provided with a disk 35 having camming lugs adapted to engage suitable abutments 36 connected to the electrodes. The means here shown is adapted to move the electrodes away from the terminal, it being understood that springs similar to those illustrated in Figs. 1 and 2 will restore the electrodes to the bond terminal as soon as the electrodes are released by the mechanical device which moves them in the reverse direction. For a complete understanding of the mechanical vibrator conventionally or diagrammatically shown in Figs. 5 and 6, reference is had to the co-pending apparatus application, which, as before stated, is filed of even date herewith.

I have previously stated that my invention is capable of use with either a single electrode or two electrodes, and in Figs. 7 and 8 I have shown a single electrode 37 which is adapted to be vibrated by a magnet 38, which it will be understood is similar to that shown in Figs. 1 and 2, the spring which moves the electrode back into engagement with the terminal of the bond not being shown. In this case the electric circuit is from one terminal of the secondary through the coil of the magnet 38 through the single electrode 37, through the bond, and from either the bond or rail back to the other terminal of the transformer secondary. In this instance the last mentioned terminal of the transformer is shown connected to the rail, but it may be connected to the bond at any suitable point between the bond terminals.

When the invention is used for uniting copper bonds to steel rails, the bond will be brazed to the rail by the apparatus and process above described for the reason that the heat is applied directly to the bond which has a lower melting point than the steel and conducts away heat less rapidly than the rail. However, under different circumstances or with different metals which are to be united, or with the same metals, as above described, if the heat is applied to the member having the higher fusion point, it may be possible to weld the members together.

While I have shown two or three modifications of my invention, I do not desire to be confined to the apparatus or to the particular mechanical or electrical devices shown for carrying out or putting into use the method embodying my invention, but any other suitable apparatus capable of carrying out the invention may be employed.

Having thus described my invention, what I claim is:—

1. The method of uniting two adjacent metal bodies which comprises passing an electric current directly between a heating electrode and one only of said bodies and causing a rapidly interrupted arcing to take place between the two.

2. The method of uniting metal bodies which comprises passing a current directly between a heating electrode and one only of the bodies while the two bodies are in engagement, and causing a vibratory relative movement between the electrode and said body so as to cause an arcing between the same.

3. The method of uniting metal bodies which comprises vibrating a heating electrode against one only of the bodies while the latter is held against the other body, and passing an electric current between the electrode and said first body.

4. The method of uniting one metal body to another, which comprises passing an electric current directly between a high resistance heating electrode and one only of the bodies, while the latter is in engagement with the other body, and rapidly moving the electrode into and out of engagement with said body, whereby said body is heated by the arc and by the heat imparted to said body by conduction from the electrode.

5. The method of uniting two engaging bodies, which comprises passing an electric current through two heating electrodes and one of the bodies, with the three parts in series relationship, and causing arcing to take place between the electrodes and said body.

6. The method of uniting two adjacent metal bodies which comprises passing an electric current through a plurality of heating electrodes and one of said bodies with the parts in series relationship and causing a rapid relative movement between the electrodes and said body, whereby arcing is produced between the electrodes and said body.

7. The method of uniting two adjacent metal bodies which comprises passing an electric current between a plurality of electrodes and one of the bodies with the parts in series relationship, and alternately moving the electrodes away from and into engagement with said body.

8. The method of uniting two metal bodies which comprises forcibly pressing against one of the bodies which heats the other by conduction, a high resistance heating electrode, passing a heating current through the electrode and causing an arcing in the circuit at the electrode so as to caus an intense heating action by the electrod 9. The method of uniting two metal bodie which comprises pressing against one of th bodies which heats the other by conductio a high resistance heating electrode, passin a heating current through the electrode, an causing a relative movement and consequen arcing in the circuit at the electrode wher by the electrode is brought to a high ten perature.

In testimony whereof, I hereunto affix m signature in the presence of two witnesses.

LAWRENCE P. CRECELIUS.

Witnesses:
L. I. PORTER,
A. J. HUDSON.